United States Patent
Tran et al.

(10) Patent No.: US 10,480,711 B1
(45) Date of Patent: Nov. 19, 2019

(54) MAGNET MOUNT APPARATUS FOR A PORTABLE COMMUNICATION DEVICE

(71) Applicant: MOTOROLA SOLUTIONS, INC, Chicago, IL (US)

(72) Inventors: Chi T. Tran, Naperville, IL (US); Ryan M Nilsen, Plantation, FL (US); Sze Yen Lim, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/043,502

(22) Filed: Jul. 24, 2018

(51) Int. Cl.
| F16M 13/00 | (2006.01) |
| F16M 13/04 | (2006.01) |
| A45F 5/02 | (2006.01) |

(52) U.S. Cl.
CPC ............... *F16M 13/04* (2013.01); *A45F 5/02* (2013.01); *A45F 2200/0516* (2013.01); *A45F 2200/0533* (2013.01)

(58) Field of Classification Search
CPC ... F16M 13/04; A45F 5/02; A45F 2200/0516; A45F 2200/0533
USPC .......................................................... 224/183
See application file for complete search history.

(56) References Cited

U.S. PATENT DOCUMENTS

| 2,693,654 | A | * | 11/1954 | Clark | A44B 1/28 224/183 |
| 5,125,134 | A | * | 6/1992 | Morita | A44C 5/2071 24/303 |
| 5,283,966 | A | * | 2/1994 | Rader | A44C 3/001 40/1.5 |
| 7,120,972 | B2 | * | 10/2006 | O'Banion | A42B 1/24 24/303 |
| 7,140,047 | B2 | * | 11/2006 | Kronenberger | A42B 1/24 2/209.13 |
| 7,267,479 | B2 | * | 9/2007 | Terentiev | A61M 1/127 366/273 |
| 7,360,334 | B2 | * | 4/2008 | Christiansen | A01K 77/00 2/94 |
| 8,317,067 | B2 | * | 11/2012 | Lewis | A45F 5/02 224/183 |
| 8,615,853 | B2 | * | 12/2013 | Rathbun | H01F 7/0252 24/3.1 |
| 8,616,422 | B2 | * | 12/2013 | Adelman | A45F 5/00 224/191 |
| 9,380,258 | B2 | | 6/2016 | Sandy | |
| D762,942 | S | | 8/2016 | Patulski | |
| 9,851,178 | B2 | | 12/2017 | Cosso | |
| 2005/0167485 | A1 | * | 8/2005 | Taras | A44C 3/001 235/380 |

(Continued)

OTHER PUBLICATIONS

SP Gadgets, "Flex Mount", http://www.sp-gadgets.com/en/actioncam-accessories/flex-mount-2, retrieved from the Internet: Jun. 20, 2018, all pages.

*Primary Examiner* — Peter N Helvey
(74) *Attorney, Agent, or Firm* — Barbara R. Doutre; Ryan Oliver

(57) ABSTRACT

A mounting apparatus for a portable communication device is provided. The mounting apparatus is mountable and secured onto a wearable garment or other external substrate using both magnetic engagement and tethers. The mounting apparatus minimizes shaking of the portable communication device and/or the possibility of the portable communication device getting knocked off the external substrate.

27 Claims, 14 Drawing Sheets

(56) References Cited

U.S. PATENT DOCUMENTS

| | | | | |
|---|---|---|---|---|
| 2006/0022822 A1* | 2/2006 | Wong | ................. | A45F 5/02 340/568.1 |
| 2006/0032877 A1* | 2/2006 | Obolo | ................. | A45F 5/02 224/269 |
| 2006/0054647 A1* | 3/2006 | Kathrein | ................. | A45C 1/04 224/183 |
| 2006/0237495 A1* | 10/2006 | Chen | ................. | A45F 5/02 224/197 |
| 2008/0023508 A1* | 1/2008 | Harchol | ................. | A45F 5/02 224/183 |
| 2016/0028947 A1 | 1/2016 | Wexler et al. | | |
| 2017/0105510 A1 | 4/2017 | Tran et al. | | |
| 2018/0109765 A1 | 4/2018 | Wu | | |

\* cited by examiner

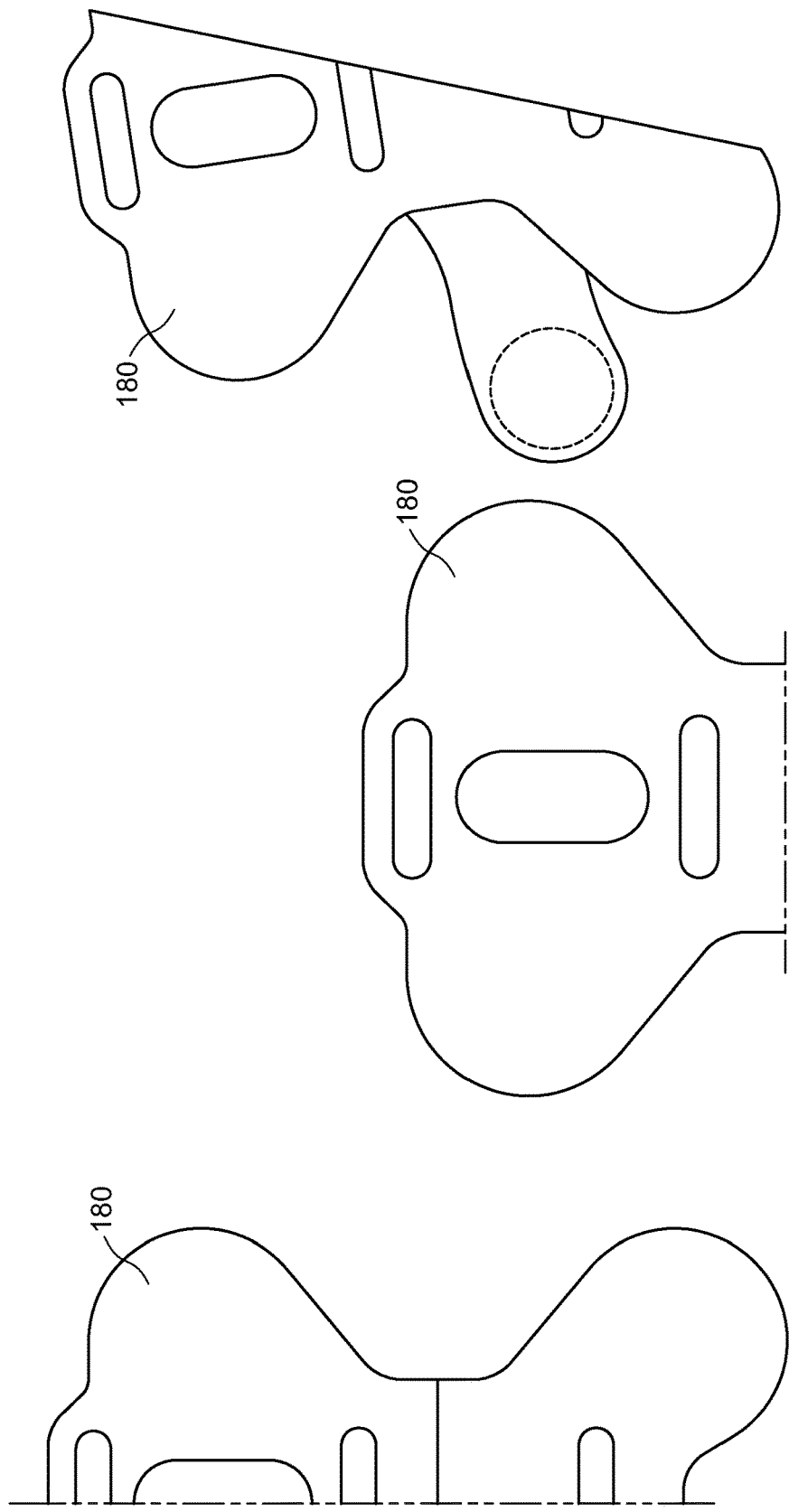

MAGNET MOUNT APPARATUS FOR A PORTABLE COMMUNICATION DEVICE

FIELD OF DISCLOSURE

The present disclosure relates generally to electronic device mounts and more particularly to mounts for portable communication devices.

BACKGROUND OF THE INVENTION

Police officers, third party security companies, emergency rescue personnel, and other safety officials increasingly wear electronic devices on their bodies to assist them with their jobs. Particularly, the prevalence of body-worn devices having cameras is increasing. Contrary to many other accessories a user might wear, body-worn devices having cameras requiring users to mount the cameras at a central location on the body to provide the best point of view of user activities and surroundings. For quality recordings, body-worn devices having cameras must also be stable on the body to eliminate shaky and blurry recordings. Another challenge is that body-worn devices require improved anchoring to prevent devices from being knocked off users. It is highly desirable that all of the aforementioned challenges are met for a variety of outfits a user might wear such as polo shirts, coats, jackets, Class A police uniforms and tactical vests.

Accordingly, there is a need for an improved mounting apparatus for portable communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3C-E show the flexible magnetic frame in accordance with some embodiments.

Figure 1A:
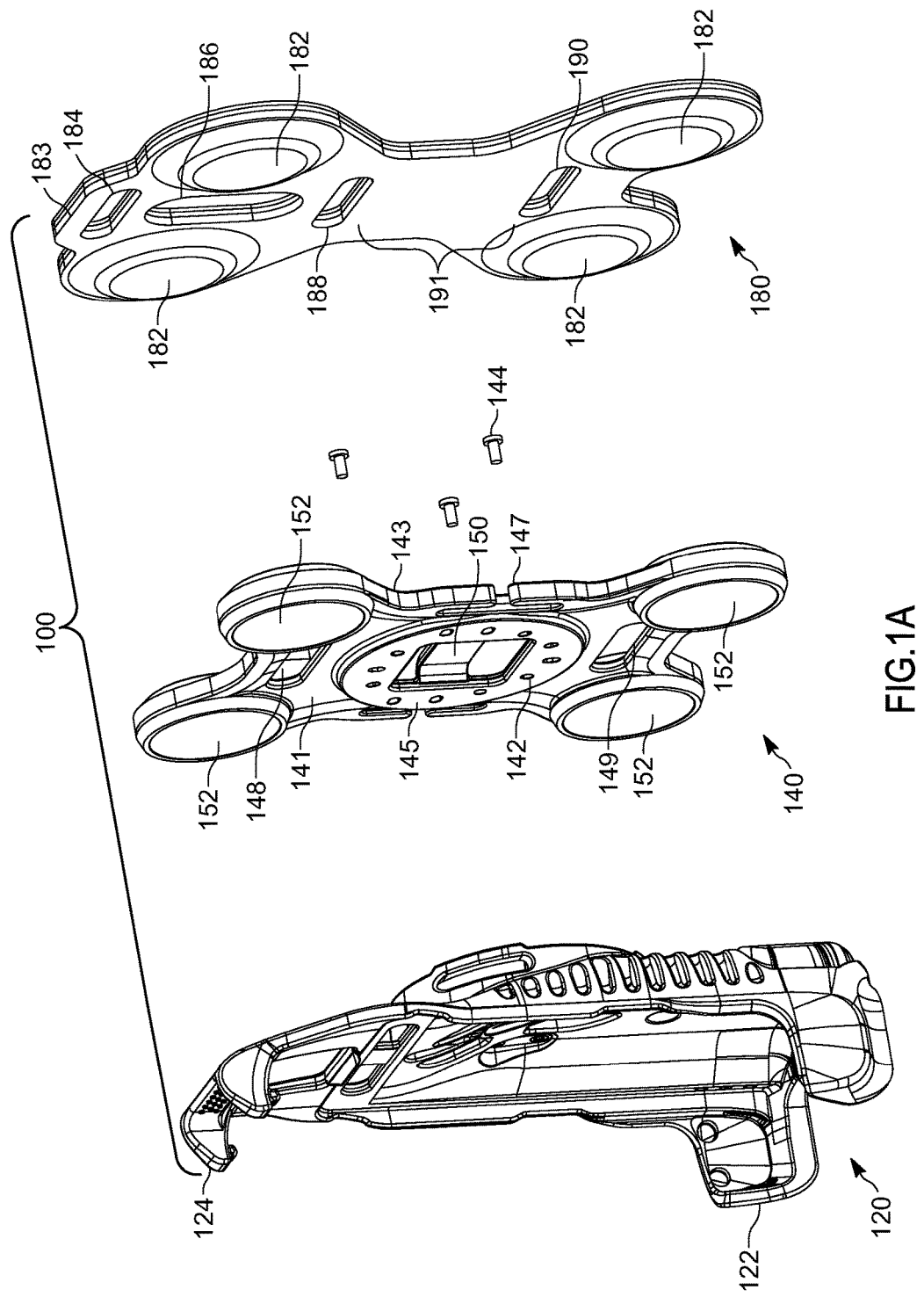
FIG. 1A is a first exploded view of the mounting apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, an improved mounting apparatus for portable electronic communication devices which will also be referred to as portable communication devices is described herein. In accordance with the embodiments, the mounting apparatus comprises a holster, a rigid magnetic frame, and a flexible magnetic frame. The holster holds the electronic device. Both magnetic frames have coinciding magnets that engage through clothing or other external substrates to provide a stable anchor for the electronic device. Both the rigid magnetic frame and the flexible magnetic frame contain features that allow for tethering together as well as to clothing and some other external substrates.

FIG. 1A shows a front isometric exploded view of a mounting apparatus 100 comprising a holster 120, a rigid magnetic frame 140, and a flexible magnetic frame 180. The holster 120 has a base holster portion 122 and a holster hook portion 124 that secure a portable communication device. More detail on the holster 120 and portable communication device 601 interaction is discussed in FIG. 6A and FIG. 6B.

The rigid magnetic frame 140 in FIG. 1A has a front surface 141 and a back surface 143 forming a single molded rigid main body. The rigid magnetic frame also has a plurality of screw holes 142 to adjustably secure the screw mount of the rigid magnetic frame 145 to the holster 120 with a plurality of mounting screws 144. The screw holes are oriented so that the holster and rigid magnetic frame can couple at multiple orientations that vary by integrals of 90 degrees. These orientations include an upright device as shown further in FIG. 6B, when the device is rotated 90 degrees clockwise, when the device is rotated 90 degrees counterclockwise, and when the device is rotated 180 degrees from the upright position. The rigid magnetic frame 140 also has an integrated clip system that comprises of a plurality of side integrated anti-rip clips 147, a top tether cutout 148, a bottom tether cutout 149, and a center buckle 150. These components of the integrated clip system will be discussed in further detail in FIG. 5A and FIG. 5B. The rigid magnetic frame also has a plurality of magnet couplers 152. A plurality of magnets are inserted into these couplers as will be further discussed in FIG. 2A and FIG. 2B.

The flexible magnetic frame 180 is made of layers of flexible rubber material and contains flexible magnetic couplers 182 to hold a plurality of magnets 306 at the corners of the flexible magnetic frame. The flexible magnetic frame 180 comprises a first tether cutout 184, a relief hole 186, a second tether cutout 188 and a third tether cutout 190. The first tether cutout is shaped as a horizontal slot wide enough to fit a 1 inch strap such as a lanyard strap through the slot and aligned on a middle top edge 183 of the flexible magnetic frame. The first tether cutout is designed to provide flexibility, stress relief, and access for tethering. The relief hole 186 is placed below the first tether cutout to provide additional flexibility and mounting capability to the flexible magnet frame 180. The relief hole is oriented in as a vertical slot, preferably a pill shape. The second tether cutout 188 is aligned below the relief hole 186 near the center of the flexible magnetic frame in the shape of a horizontal slot wide enough to allow a 1 inch strap to thread through. The third tether cutout 190 is aligned below the second tether cutout 188 with a predetermined amount of spacing 191 between the second tether cutout 188 and third tether cutout 190. The third tether cutout 190 is also shaped in a horizontal slot wide enough to allow a 1 inch strap to thread through the cutout.

Figure 1B:
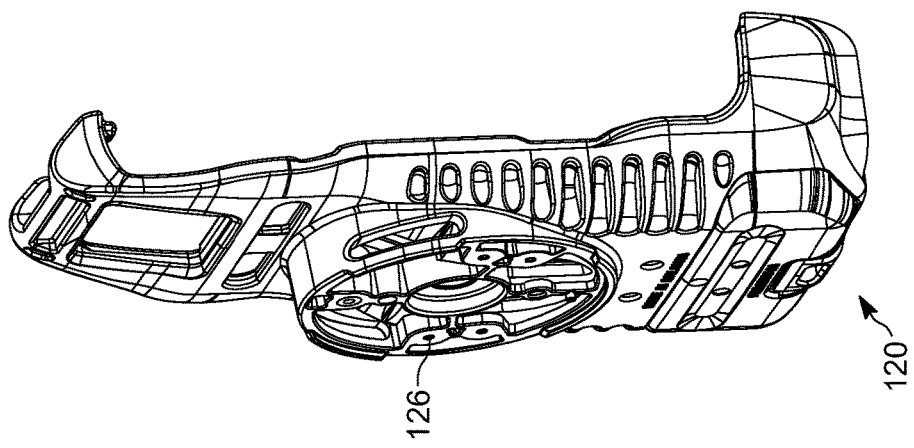
FIG. 1B is a second isometric view of the mounting apparatus in accordance with some embodiments.
Figure 1B:
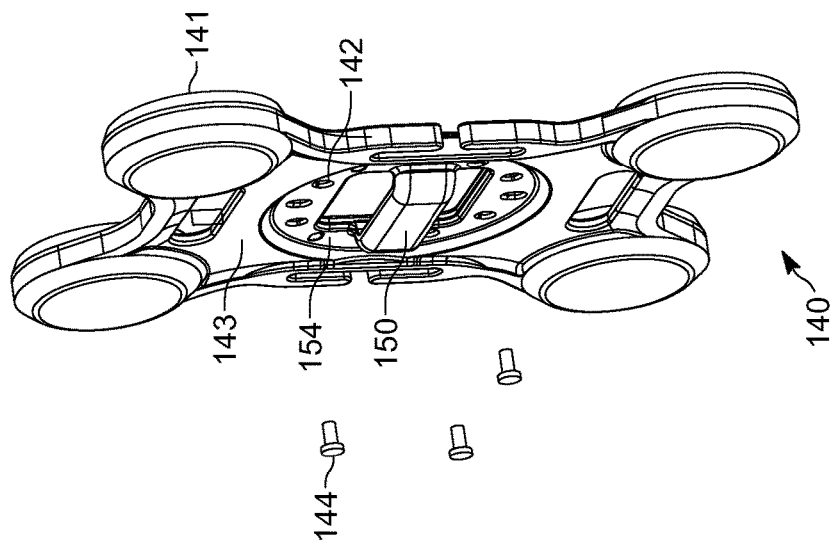
Figure 1B:
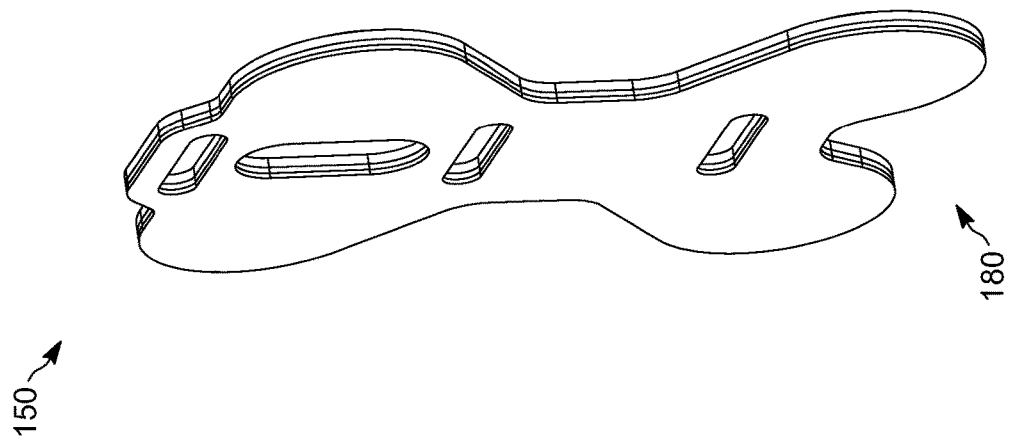

FIG. 1B shows a back isometric exploded view of the mounting apparatus 100. A plurality of holster screw holes 126 in the holster 120 correspond with the plurality of screw holes 142 on the rigid magnetic frame 140 and couples with mounting screws 144. On the rigid magnetic frame 140, a center recess 154 is seen surrounding the center buckle 150. The purpose of the center recess will be further explained in FIG. 5A.

Figure 2A:
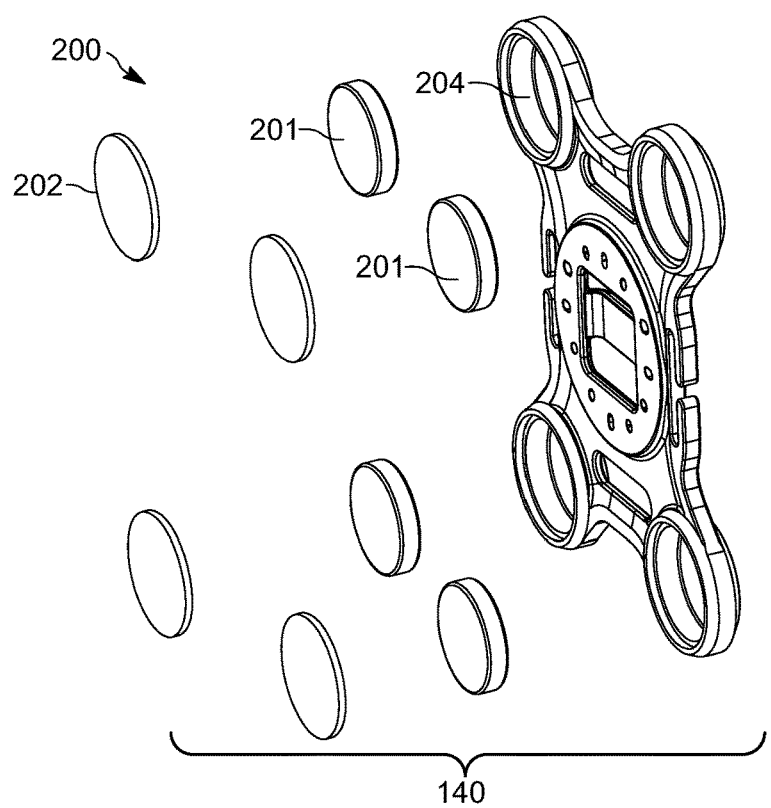
FIG. 2A is a first exploded view of a rigid structure associated with the mounting apparatus in accordance with some embodiments.

FIG. 2A shows a front isometric exploded view 200 of the rigid magnetic frame 140. This view shows a plurality of magnets 201 exploded from the magnet pockets 204 and the magnet caps 202 that couple to the rigid magnetic frame to secure the plurality of magnets 201. The combination of magnets 201, magnet pockets 204, and magnet caps 202 form the magnet couplers 152 in FIG. 1A.

Figure 2B:
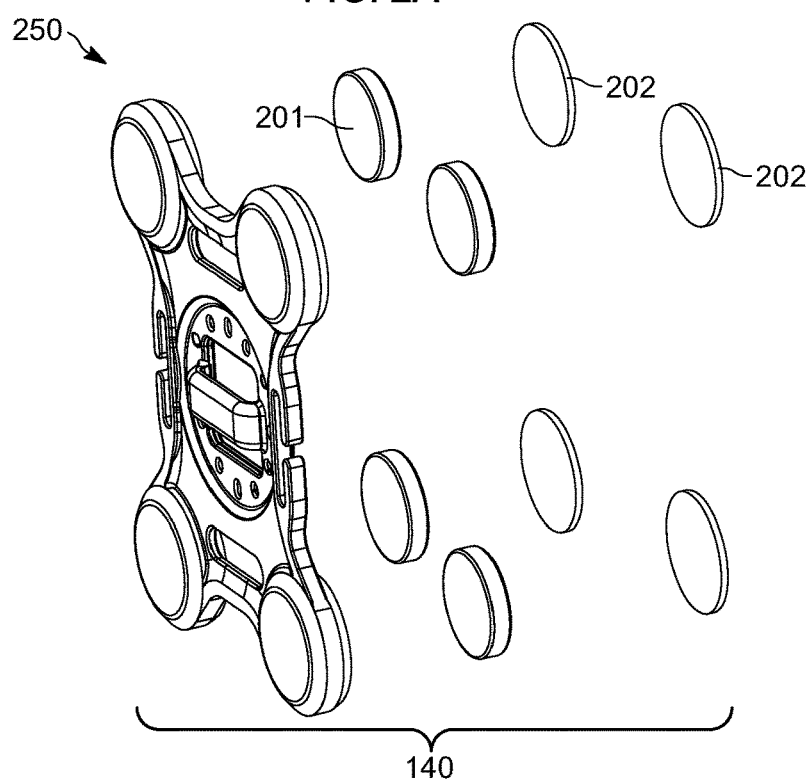
FIG. 2B is a second exploded view of the rigid structure of the mounting apparatus in accordance with some embodiments.

FIG. 2B shows a back isometric exploded view 250 of the rigid magnetic frame 140, plurality of magnets 201, and magnet caps 202. The plurality of magnets 201 are received within magnet pockets 204.

Figure 3A:
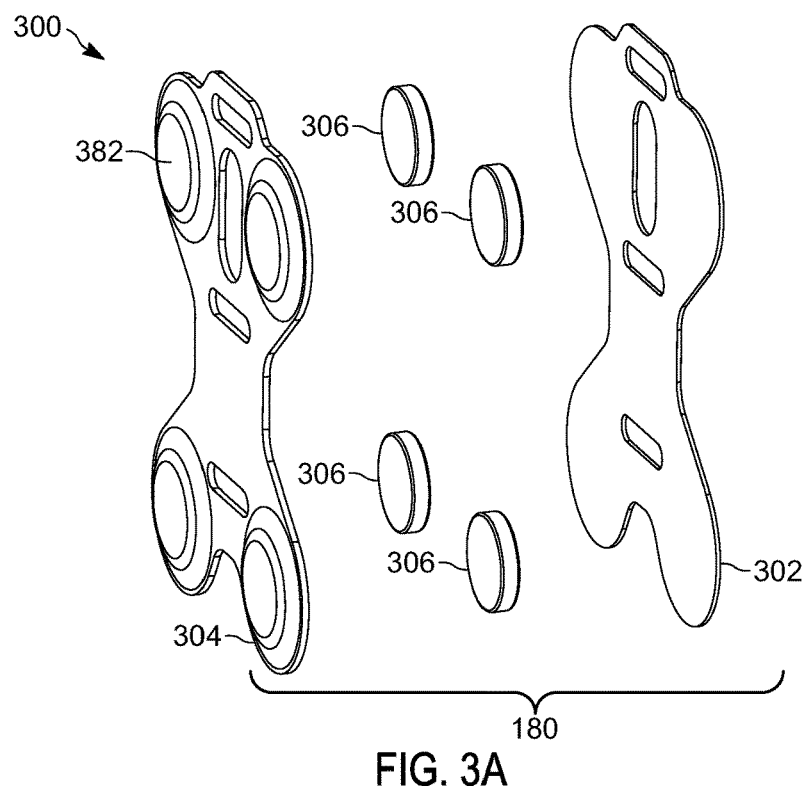
FIG. 3A is a first exploded view of a flexible magnetic structure associated with the mounting apparatus in accordance with some embodiments.
Figure 3B:
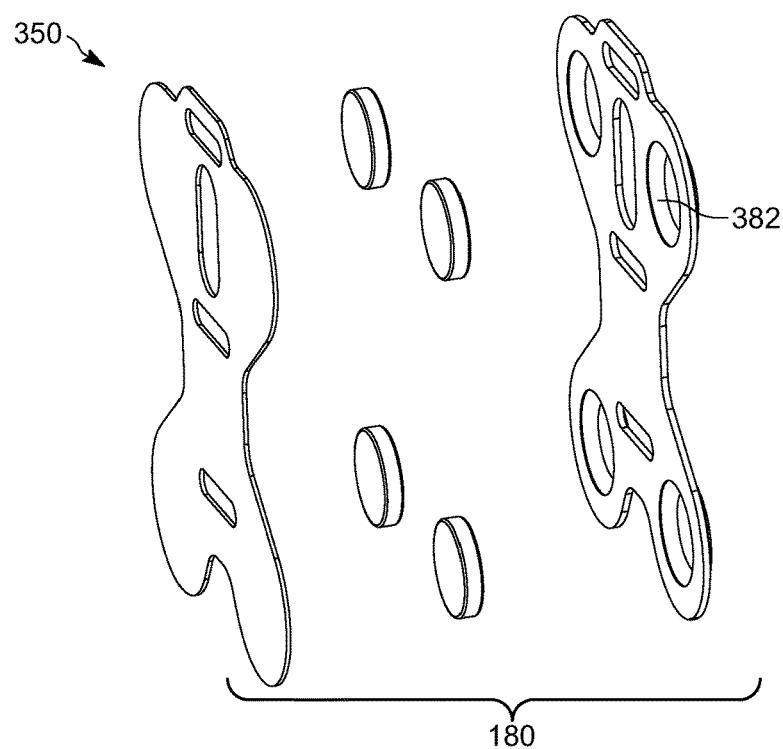
FIG. 3B is a second exploded view of the flexible magnetic structure associated with the mounting apparatus in accordance with some embodiments

FIG. 3A shows a front exploded view 300 of the flexible magnetic frame 180. FIG. 3B shows another exploded view 350 of the flexible magnetic frame 180. The flexible magnetic frame is formed of a flexible material, such as flexible rubber material with a plurality of magnets 306 integrated therein. This material is preferably selected to reduce overall thickness of the flexible magnetic frame. Although shown as two layers 302, 304 which can be glued or stitched together, it is to be appreciated that the flexible magnetic frame may also be formed of a co-molded material encasing the plurality of magnets 306 within a flexible rubber substrate. In accordance with the embodiment, a predetermined magnetic pull force between the plurality of magnets in the flexible magnetic frame 180 and a plurality of magnets in the rigid magnetic frame 140 is greater than 20 lbs. The plurality of magnets 306 is sufficiently spaced apart to minimize interference with wearable garment features. Theses wearable garment features include but are not limited to: zippers, straps, padding, and buttons.

In accordance with the embodiments, the flexible magnetic frame 180 is formed of a highly flexible yet durable material that has the ability to fold upon itself. The flexible magnetic frame 180 is preferably formed of a flexible rubber material configured to be conformable to variations in thickness of a wearable garment and to accommodate wearable garment features. The flexible material provides an anti-slip surface to prevent the mounting apparatus from sliding upon the wearable garment or other mounting surface. Other mounting surfaces will be discussed later. FIG. 3C shows the flexible magnetic frame 180 in accordance with a first flexible orientation. The first orientation shows the flexible magnetic frame 180 folded horizontally at an angle of at least 90 degrees. FIG. 3D shows the flexible magnetic frame in accordance with a second flexible orientation. The second orientation shows the flexible magnetic frame 180 folded vertically at an angle of at least 90 degrees. FIG. 3E shows the flexible magnetic frame 180 folded in a combination horizontal and vertical orientation. Preferably, the flexible magnetic frame can be configured to fold upon itself.

Figure 4A:
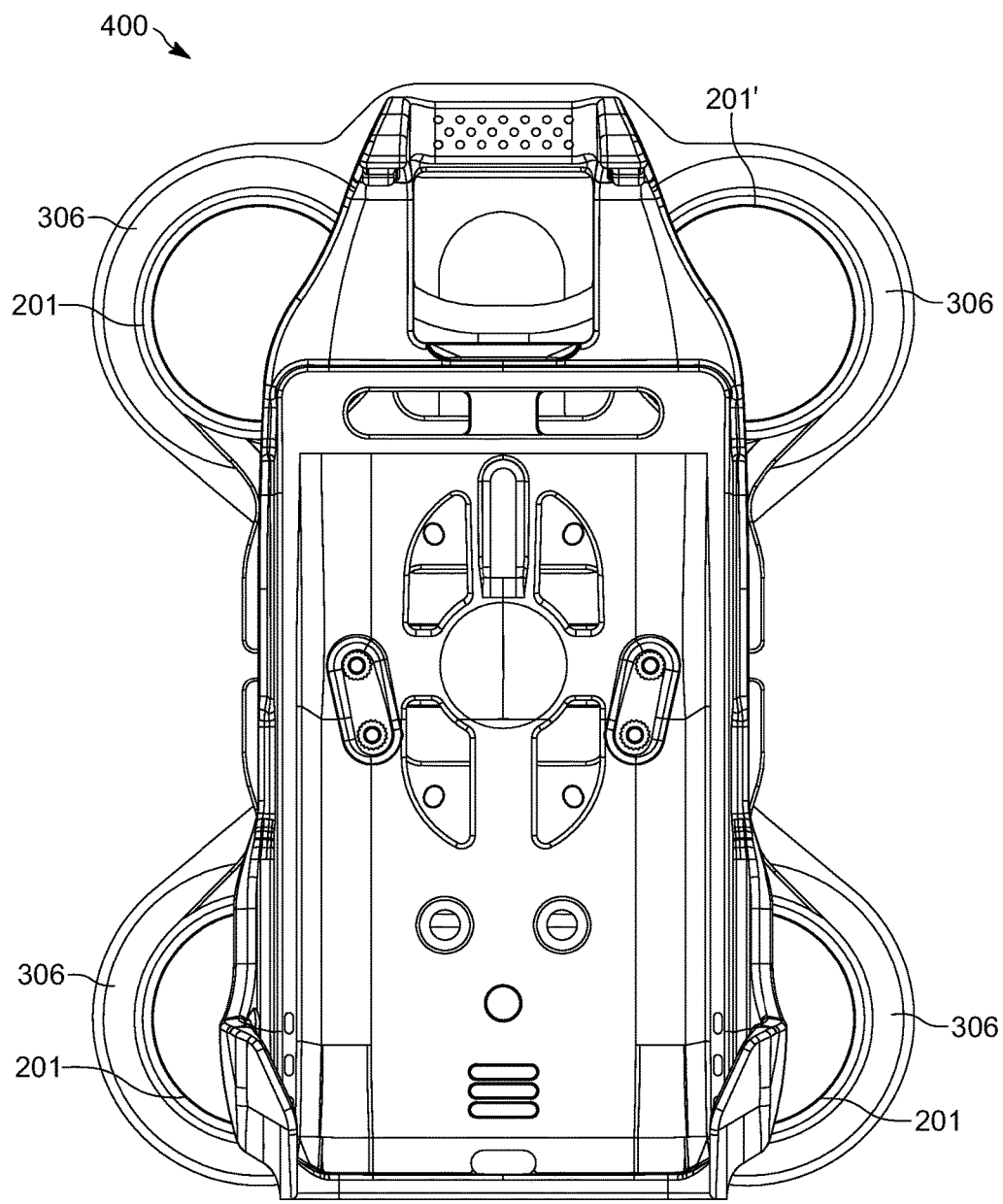
FIG. 4A is a front assembled view of the mounting apparatus in accordance with some embodiments.

FIG. 4A. Shows a fully assembled front view 400 of the mounting apparatus 100. In accordance with the embodiments, the plurality of magnets of the rigid magnetic frame 201 align with the plurality of magnets of the flexible magnetic frame 306. In accordance with the embodiments, the magnetic coupling between corresponding magnets provide a predetermined pull strength of at least 20 lbs. to reliably retain the assembly firmly to a garment or other substrate even under rugged conditions. The flexibility of the flexible magnet frame allows the magnetic coupling between corresponding magnets to be independently coupled or separated.

Figure 4B:
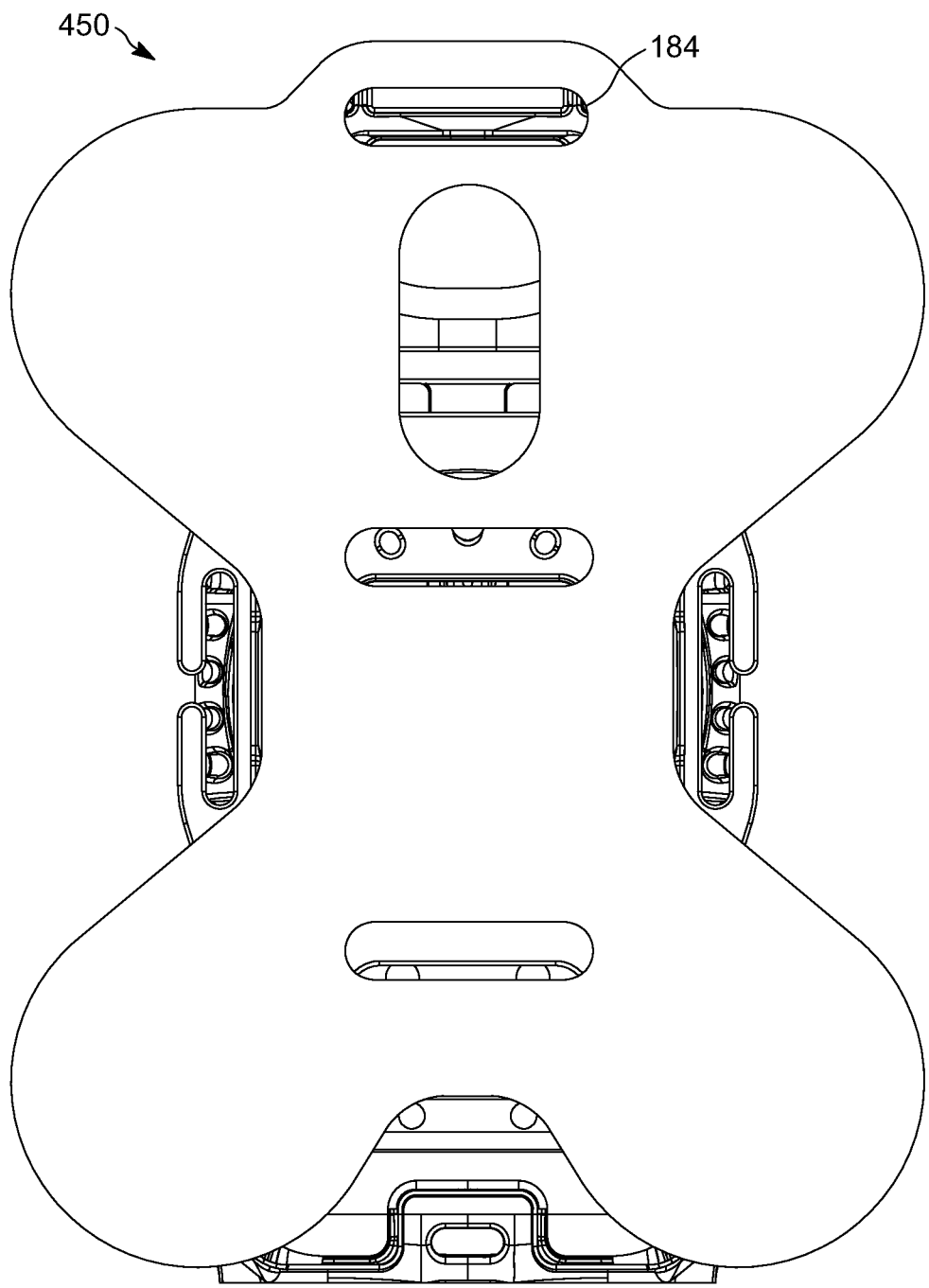
FIG. 4B is a back assembled view of the mounting apparatus in accordance with some embodiments.

Both pluralities of magnets are spaced at a predetermined position away from the portable communication device 601 to prevent magnetic fields from negatively interfering with the portable communication device. FIG. 4B shows a fully assembled back view 450 of the mounting apparatus 100. The first tether cutout 184 in the flexible magnetic frame 180 is aligned vertically higher than the top tether cutout 148 so that if both tether cutouts are tethered together, the mounting apparatus can hang lower on the body and the tether does not pull on the wearable garment.

Figure 5A:
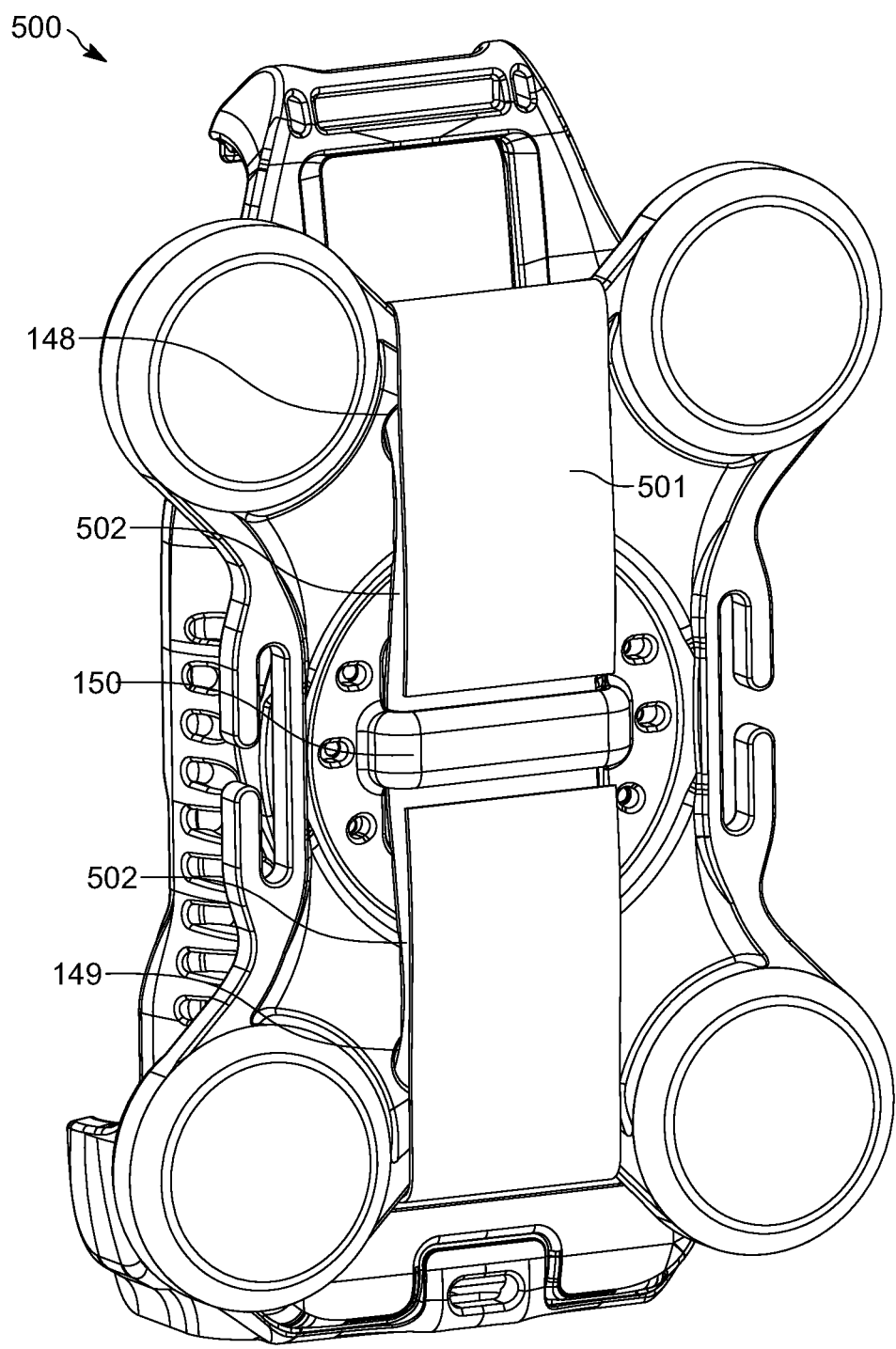
FIG. 5A shows a first tethering configuration to the mounting apparatus in accordance with some embodiments.

FIG. 5A. Shows a tethering configuration 500 to secure the rigid magnetic frame 140 to a loop in a wearable garment. A tether 501, preferably a 1 inch strap, is looped through the top tether cutout 148, underneath the center buckle 150, and looped through the bottom tether cutout 149 in a way so that the tether fastens to itself via hook and loop sections at locations 502. The primary purpose of the center buckle and bottom tether cutout is to further secure the tether in this arrangement. The center buckle is recessed in the rigid magnetic frame to prevent the increased thickness at the locations of engagement between the hook and look sections 502 of the tether 501 from interfering with the magnetic coupling between the rigid magnetic frame and the flexible magnetic frame. The spacing between the top tether cutout, center buckle, and bottom tether cutout is preferably spaced to provide optimal stability and engagement with a 1 inch strap.

Figure 5B:
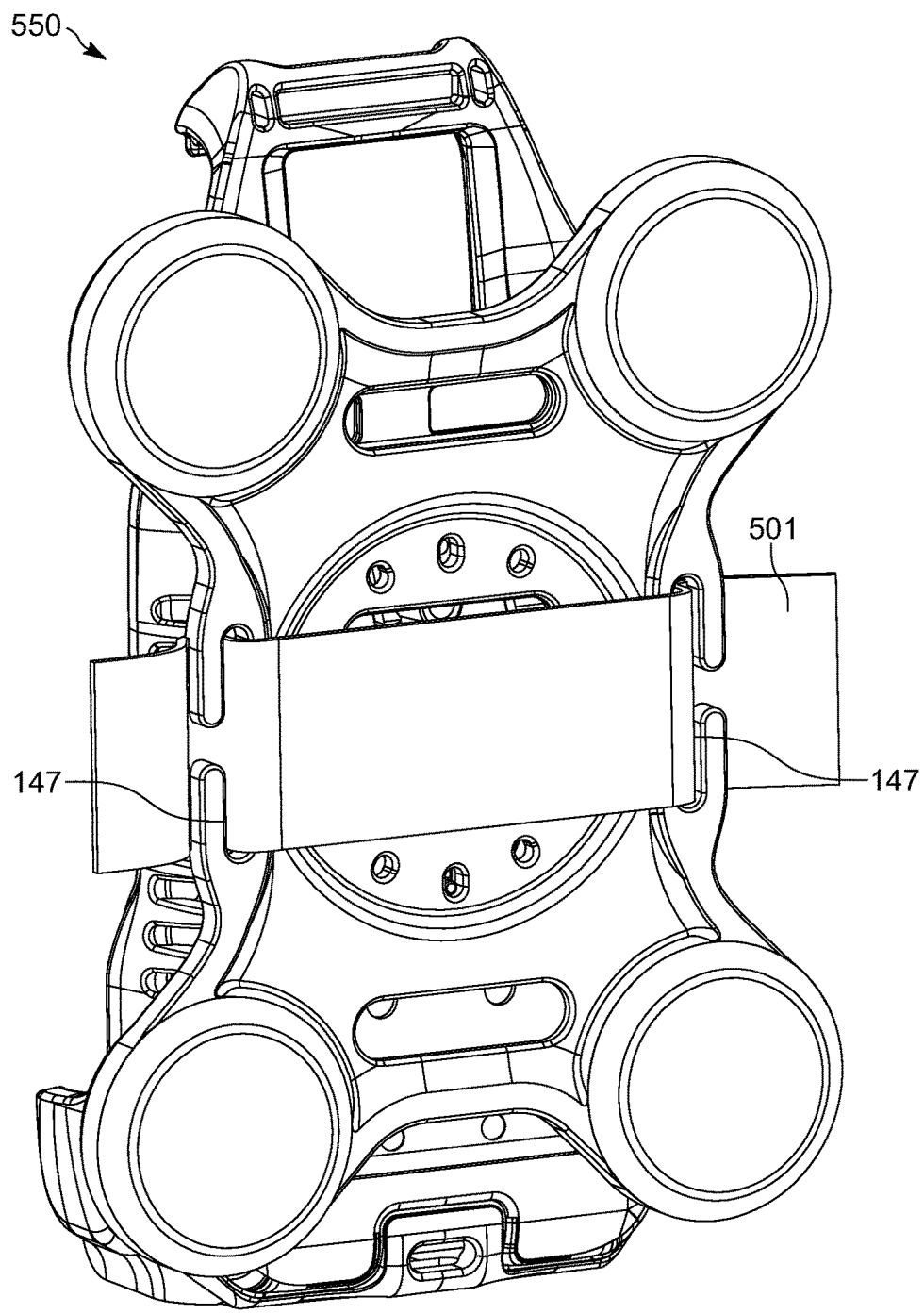
FIG. 5B shows a second tethering configuration to the mounting apparatus in accordance with some embodiments.

FIG. 5B shows another tethering configuration 550 to secure the rigid magnetic frame 140 to loops on a wearable garment. In FIG. 5B the tether 501 is threaded through a plurality of side integrated anti-rip clips 147 and over the center buckle 150 (not shown). In this configuration, the tether 501 does not have hook and loop features to fasten upon itself. In addition to securing by means of a tether 501, some wearable garments, such as tactical vests, contain horizontally oriented straps stitched onto the wearable garments. Such horizontally oriented straps can also thread through the plurality of side integrated anti-rip clips and fasten the rigid magnetic frame to the wearable garment without separate tether component.

Figure 5C:
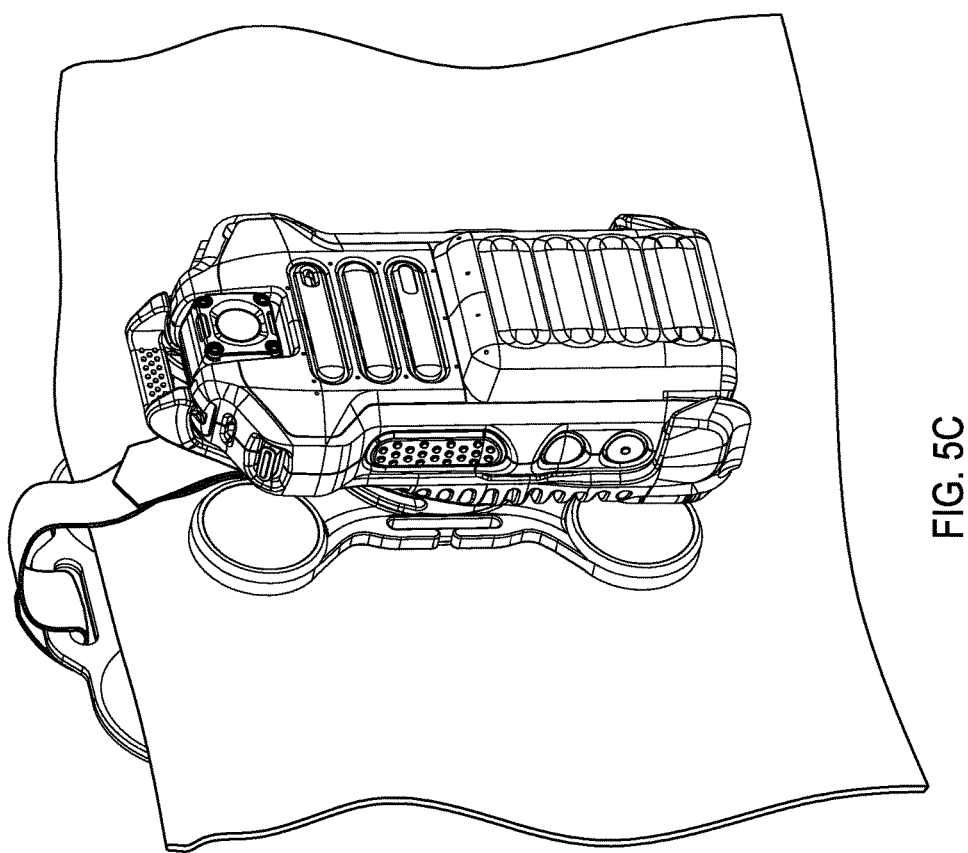
FIG. 5C shows a third tethering configuration to the mounting apparatus in accordance with some embodiments.

FIG. 5C displays another tethering configuration 575 of the magnetic mount assembly where the tether 501 connects the rigid magnetic frame 140 to the flexible magnetic frame 180 via the top tether cutout 148 on the rigid magnetic frame 140 and the first tether cutout 184 on the flexible magnetic frame 180. This configuration enables the tether 501 to connect the rigid magnetic frame 140 and the flexible magnetic 180 on a wearable garment 580 through a collar of the wearable garment (in FIG. 5C, the collar is shown as the top edge 582 of the wearable garment 580. The configuration adds an anchoring function to the flexible magnetic frame 180 because in a situation where the holster 120 and rigid magnetic frame 140 get knocked off of a wearable garment 580, the tether 501 will keep rigid magnetic frame 140 and holster 120 coupled to the flexible magnetic frame 180, which would remain secured inside of the wearable garment 580.

In further embodiments, wearable garment 580 may be replaced by non-garment objects. Non-garment objects or surfaces can include but are not limited to: vehicle and building windows, chairs, and room dividers.

Figure 6A:
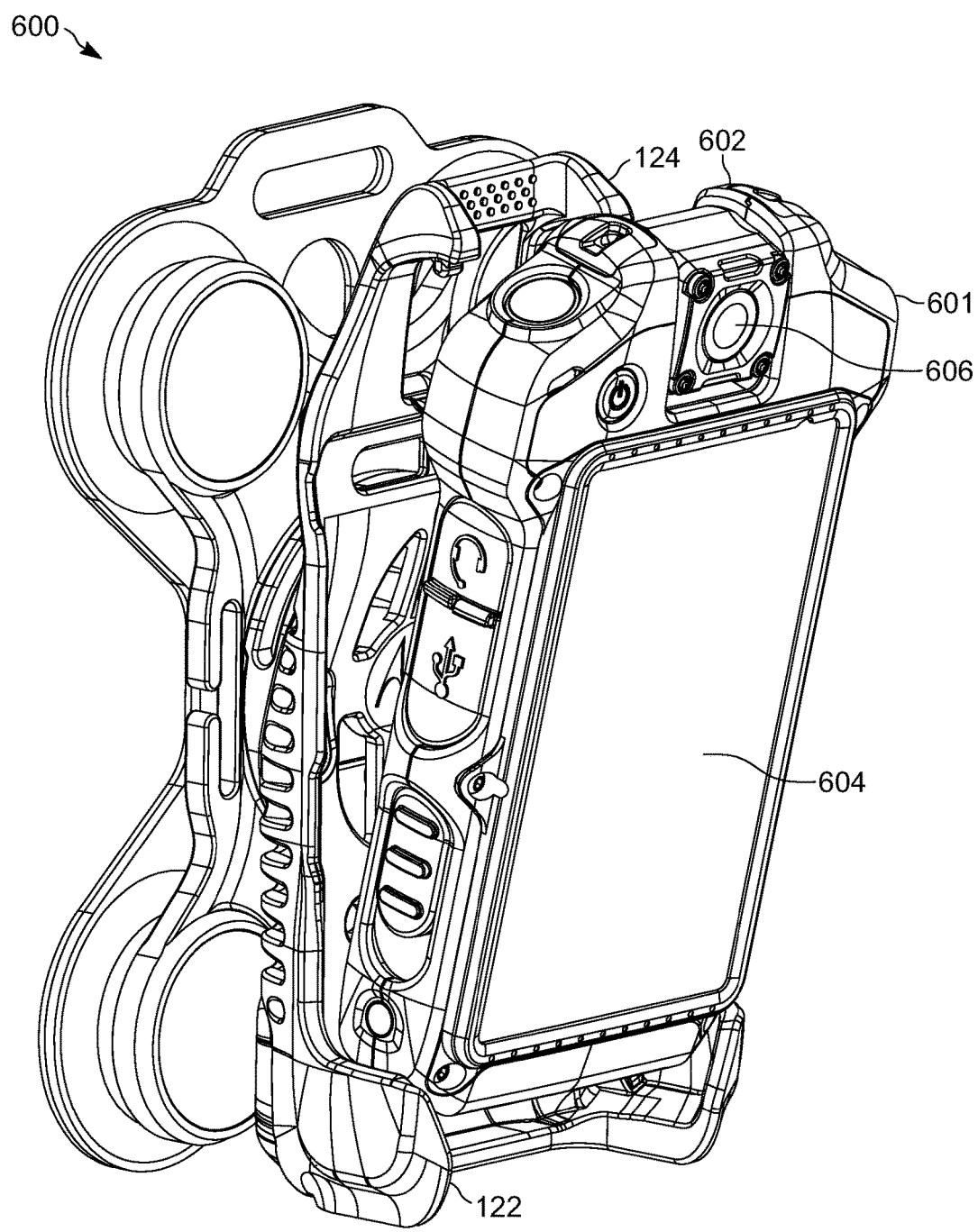
FIG. 6A shows a portable communication device being inserted in a first position to the mounting apparatus in accordance with some embodiments.

FIG. 6A is an isometric view 600 shows the portable communication device 601 being inserted into the holster of the mounting apparatus in accordance with some embodiments. The portable communication device 601 is slid base first into the base holster portion 122 and then captured at the top of the housing 602 via holster hook portion 124. The portable communication device preferably comprises a display 604 and a camera 606 which are shown being inserted in an outwardly facing position. The camera 606 is preferably a rotatable camera.

Figure 6B:
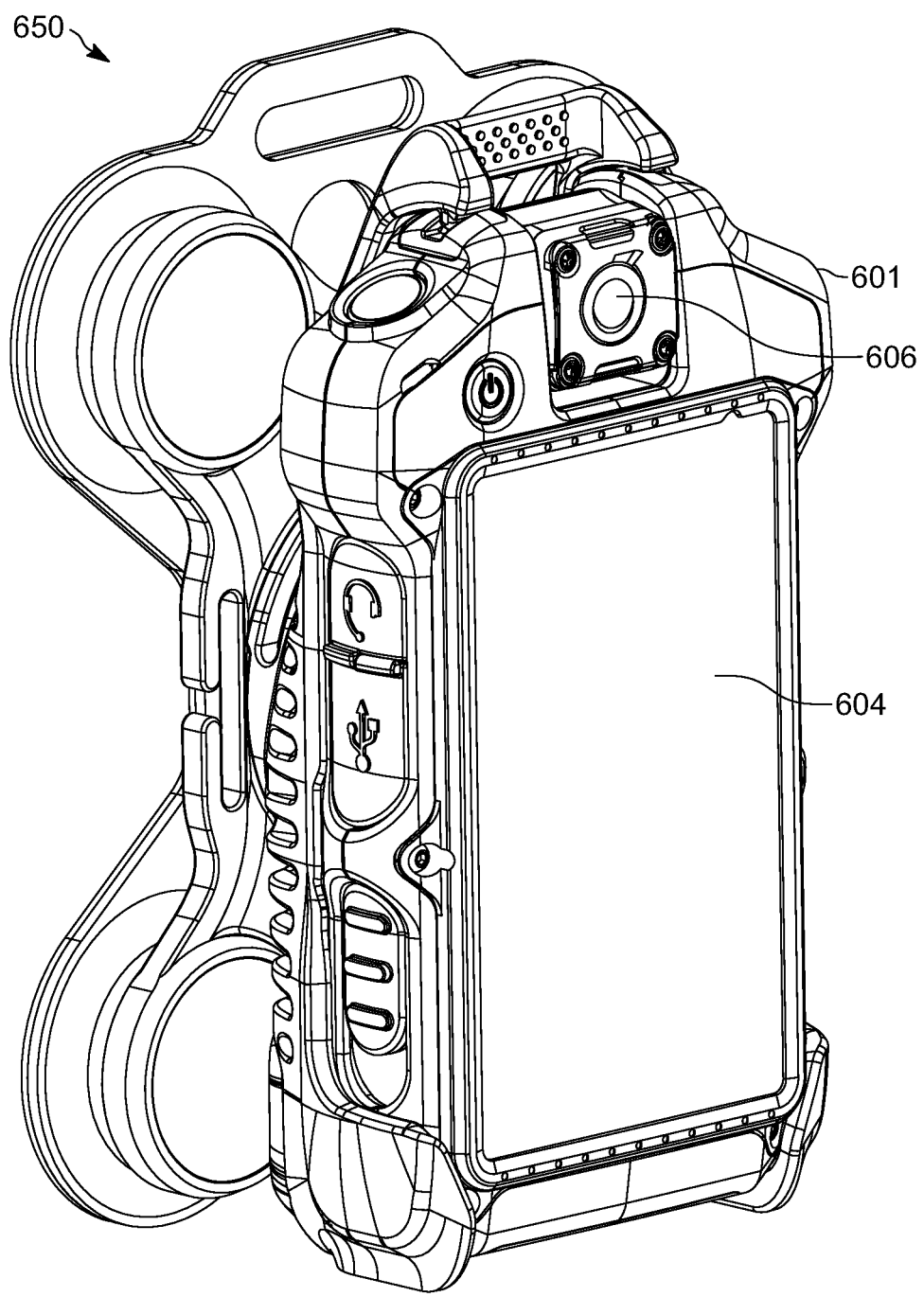
FIG. 6B shows the portable communication device being insertably coupled and retained in the first position within the mounting apparatus in accordance with some embodiments.

FIG. 6B shows the portable communication device 601 being insertably coupled and retained in a first position within the mounting apparatus 100 in accordance with some embodiments. The display 604 and camera 606 face outwardly. In accordance with the embodiments, the magnetic coupling between corresponding magnets creates magnetic fields that are oriented to trigger sensors within the portable communication device.

Figure 7:
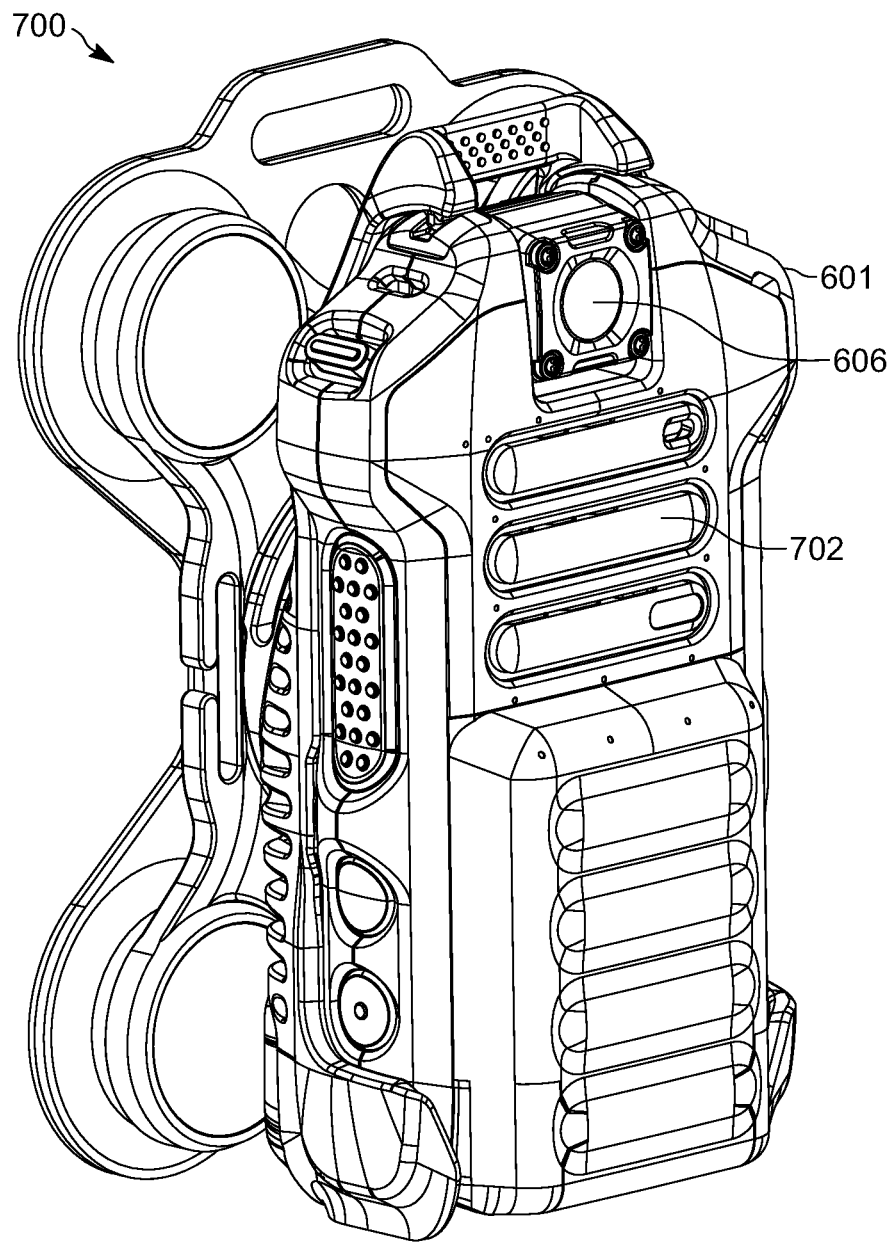
FIG. 7 shows the portable communication device being insertably coupled and retained in a second position within the mounting apparatus in accordance with some embodiments.

FIG. 7 shows the portable communication device 601 being insertably coupled and retained in a second position within the mounting apparatus 100 in accordance with some embodiments. In this second position, the portable communication device 601 has been inserted such that a speaker 702 of the device is now facing outwardly and the display is facing inwardly. The camera 606 of the portable communication device has been rotated to so as to face outwardly thereby enabling video recording.

Both positions of FIG. 6B and FIG. 7 provide for a stable mounting that improves stability and minimizes movement during video or photograph recordings. The magnetic mounting provides improved retention without negatively impacting the performance of the portable communication device.

Figure 8:
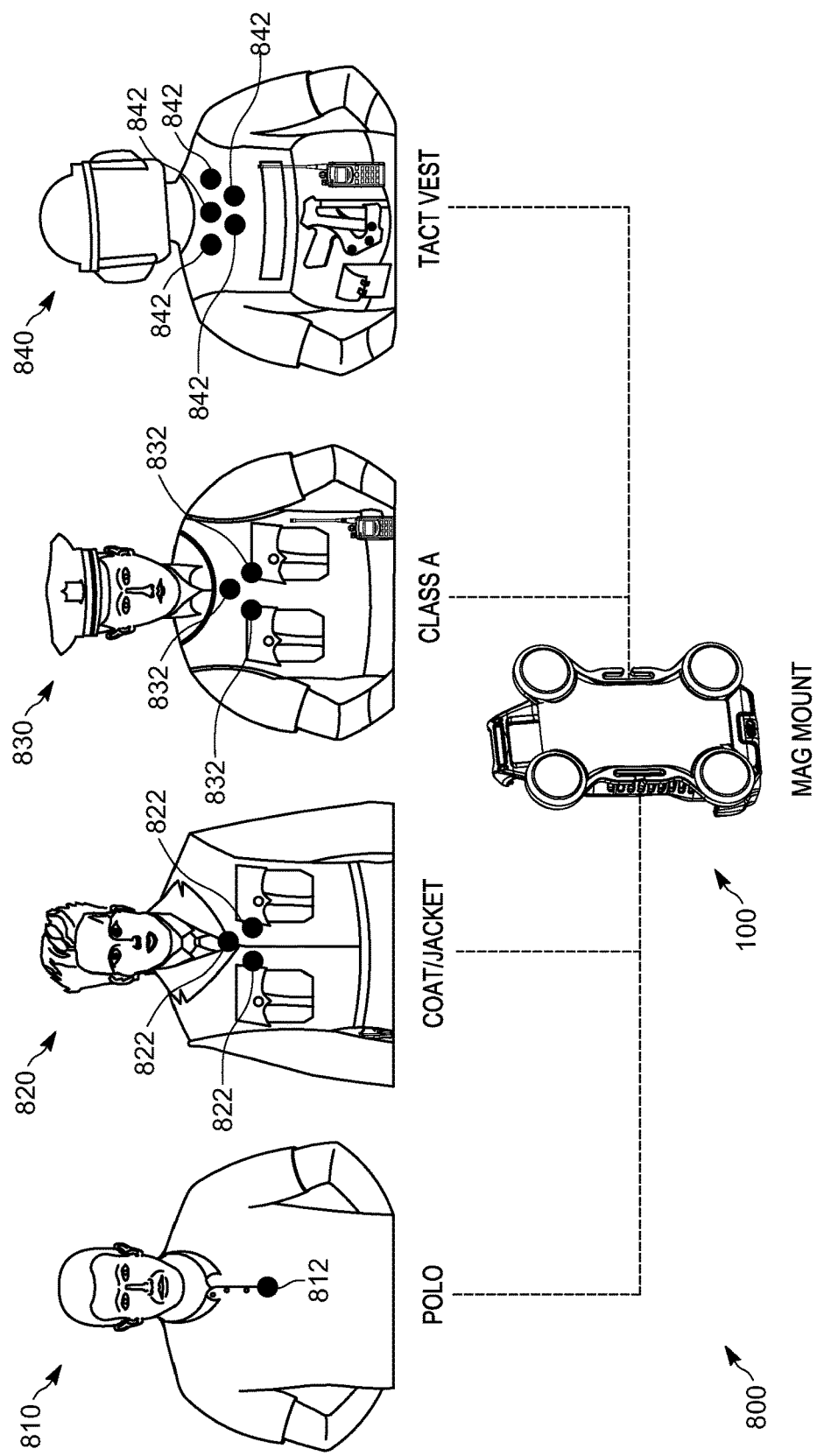
FIG. 8 shows a plurality of wearable garments to which the mounting apparatus can be mounted in accordance with some embodiments.

FIG. 8 shows a plurality of wearable garments 800 to which the mounting apparatus 100 can be mounted in accordance with some embodiments. The assembled holster 120 and rigid magnetic frame 140 coupled thereto may be magnetically coupled through a wearable garment to the flexible magnetic frame 180. Alignment of the magnets takes place as shown in previous embodiments. The mounting apparatus 100 can be worn on wearable garment features such as a placket, collar opening, pocket, epaulette of a polo shirt 810, coat, jacket 820, Class A uniform 830 (comparable to a button down shirt), tactical vest 840, and/or a T-shirt (not shown) to name a few. For example, the mounting apparatus with communication device may be mounted to a collar 812, a placket 822, a pocket 824, an epaulette 834 or Molle loops 842 of a wearable garment. Magnetic retention forces of at least 20 lbs. provides for increased staying power to the garment minimizing the potential for the device or holster from being pulled or knocked off. Spacing of the plurality of magnets accommodates features on wearable garments such as zippers, straps, and buttons.

Additionally, features within the magnetic mount assembly provide mounting capabilities to a metal surface. Examples of a metal surface can include but are not limited to: a metal door, a metal door frame, a vehicle chassis, and a metal pole. The anti-slip surface on the flexible magnetic frame combined with the plurality of magnets in the flexible magnetic frame allow for stable coupling to a metal surface. The plurality of magnets in the rigid magnetic frame combined with the tether couple the flexible magnetic frame to the rigid magnetic frame and to the holster. In these scenarios, both the flexible magnetic frame and rigid magnetic frame can be arranged on one side of the mounting surface.

Features within the magnetic mount assembly can also allow both the flexible magnetic frame and rigid magnetic frame to be arranged on the outside surface of a wearable garment. The second tether cutout 188 and third tether cutout 190 allow the flexible magnetic frame to couple to loops in a wearable garment, such as those on a tactical vest or Class A uniform. Tethering the flexible magnetic frame to the exterior of a wearable garment still allows the holster and rigid magnetic frame to magnetically couple to the flexible magnetic frame on the exterior of the wearable garment.

In addition to wearable garments and metal surfaces, the magnetic mounting apparatus can mount to non-garment surfaces with loops for tethering or with a predetermined thickness proximate to the thickness of wearable garments. Non-garment surfaces can include but are not limited to: vehicle and building windows, chairs, and room dividers. The magnetic mounting apparatus can mount externally to a surface with loops through tethering and can connect to surfaces or fabrics of predetermined thickness through the anti-slip surface of the flexible magnetic frame and the corresponding pairs of the plurality of magnets in the flexible magnetic frame and the plurality of magnets in the rigid magnetic frame.

In some embodiments, the plurality of magnets in the rigid magnetic frame can also positively activate sensors within the portable communication device that are purposefully intended to trigger when sensing the magnetic fields of the plurality of magnets in the rigid magnet frame.

Although not shown, it is anticipated that the flexible magnetic frame can also have an alternate tethering arrangement of two top tether cutouts, two bottom tether cutouts, two left tether cutouts and two right tether cutouts. The two top tether cutouts are preferably horizontally oriented slots and positioned vertically above one another and below the middle top edge of the flexible magnetic frame. The two bottom tether cutouts are preferably horizontally oriented slots and positioned vertically above one another and above the middle bottom edge of the flexible magnetic frame. The two left tether cutouts are preferably vertically oriented slots positioned side by side to the right of the middle left edge of the flexible magnetic frame. The two right tether cutouts are preferably vertically oriented slots positioned side by side to the left of the middle right edge.

Accordingly, there has been provided an improved mounting apparatus for body wearable portable communication devices that provides increased stability. The mounting apparatus is particularly advantageous for communication devices that incorporate a camera due to the increased stability provided by the flexible yet ruggedized mounting approach. The mounting apparatus configuration is configured to adapt to a variety of wearable garments as well as to other external substrates.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mounting apparatus for an electronic communication device comprising:

a holster to secure a device;

a rigid magnetic frame having a front surface and a back surface, wherein the rigid magnetic frame is adjustably coupled to the holster at the front surface and further has an integrated clip system at the back surface, the integrated clip system being configured to engage with a front surface of a wearable garment, the integrated clip system comprising a top tether cutout and a bottom tether cutout with space therebetween for accommodating a lanyard strap; and a center buckle between the top tether cutout and the bottom tether cutout to further secure the lanyard strap to the mounting apparatus; and a flexible magnetic frame configured to be positioned behind a back surface of an article of clothing while magnetically being engaged with the rigid magnetic frame, and the center buckle being recessed to prevent an engagement of the lanyard strap from hindering a magnetic engagement between the rigid magnetic frame and the flexible magnetic frame.

2. The mounting apparatus of claim 1, wherein the flexible magnetic frame is formed of a flexible material, with a plurality of magnets integrated therein.

3. The mounting apparatus of claim 2, wherein the flexible material contains rubber material that encases the plurality of magnets.

4. The mounting apparatus of claim 2, wherein the plurality of magnets is stitched between a plurality of layers of flexible rubber material.

5. The mounting apparatus of claim 2, wherein the plurality of magnets is co-molded within a flexible rubber substrate.

6. The mounting apparatus of claim 2, wherein the plurality of magnets can be independently coupled and separated.

7. The mounting apparatus of claim 2, wherein the flexible material provides an anti-slip surface to prevent the mounting apparatus from sliding upon the wearable garment.

8. The mounting apparatus of claim 7, wherein a combination of the plurality of magnets in the flexible magnet frame and the anti-slip surface enable the mounting apparatus to mount externally onto a metal surface.

9. The mounting apparatus of claim 8, wherein the metal surface comprises at least one of:

a metal door;

a metal door frame;

a vehicle chassis; and a metal pole.

10. The mounting apparatus of claim 2, wherein the flexible material is configured to be conformable to variations in thickness of a wearable garment and to accommodate wearable garment features.

11. The mounting apparatus of claim 10, wherein the wearable garment features comprise:
   zippers;
   straps;
   padding; and
   buttons.

12. The mounting apparatus of claim 10, wherein the flexible material is further configured to be conformable to non-garment surfaces of a predetermined thickness.

13. The mounting apparatus of claim 1, wherein the integrated clip system of the rigid magnetic frame further comprises:
   side integrated anti-rip clips to prevent mounting apparatus separating from the wearable garment.

14. A mounting apparatus for an electronic communication device comprising:
   a holster to secure a device;
   a rigid magnetic frame having a front surface and a back surface, wherein the rigid magnetic frame is adjustably coupled to the holster at the front surface and further has an integrated clip system at the back surface, the integrated clip system being configured to engage with a front surface of a wearable garment, comprising; and
      a flexible magnetic frame configured to be positioned behind a back surface of an article of clothing while magnetically being engaged with the rigid magnetic frame, wherein the flexible magnetic frame comprises:
      a first tether cutout that provides flexibility, relief, and an access for tethering, the first tether cutout being placed in a middle top edge of the flexible magnetic frame to allow for tethering through a collar of the wearable garment;
      a relief hole vertically below the first tether cutout to provide additional flexibility and mounting access;
      a second tether cutout located vertically below the relief hole to provide additional flexibility, relief, and access for tethering; and
      a third tether cutout near a bottom edge of the flexible magnetic frame to provide additional flexibility, relief, and access for tethering.

15. The mounting apparatus of claim 14, wherein the opening of collar of the wearable garment comprises at least one of:
   a polo shirt;
   a button down; and
   a T-shirt.

16. The mounting apparatus of claim 14, wherein the first tether cutout is formed in the shape of a horizontal slot, the second tether cutout is formed in the shape of a horizontal slot, the third tether cutout is formed in the shape of a horizontal slot, and the relief hole is formed in the shape of a vertical slot between the first tether cutout and the second tether cutout.

17. The mounting apparatus of claim 14, wherein the second tether cutout and third tether cutout can be tethered to an outside surface of a wearable garment so that the holster, the rigid magnetic frame, and the flexible magnetic frame are all external to a wearable garment.

18. The mounting apparatus of claim 1, wherein the flexible magnetic frame is configured to respectively fold horizontally and vertically at an angle of at least 90 degrees.

19. The mounting apparatus of claim 1, wherein the flexible magnetic frame is configured to fold upon itself.

20. The mounting apparatus of claim 1, wherein the rigid magnetic frame comprises:
   a single molded rigid main body with a plurality of magnets for aligning with corresponding magnets of the flexible magnetic frame.

21. The mounting apparatus of claim 20, wherein the plurality of magnets on the rigid magnetic frame activate a sensor within the electronic communication device inserted within the holster to determine the electronic communication device's position within the holster and trigger sensors within the electronic communication device.

22. The mounting apparatus of claim 1, wherein the rigid magnetic frame contains a screw mount that enables the holster to attach to the rigid magnetic frame at different orientations varying by integrals of 90 degrees.

23. The mounting apparatus of claim 1, wherein the rigid magnetic frame contains a plurality of magnets spaced apart so that magnetic fields from the plurality of magnets do not negatively interfere with an electronic device held within the holster, and the plurality of magnets being sufficiently spaced apart to minimize interference with wearable garment features.

24. The mounting apparatus of claim 1, wherein a magnetic pull force between a plurality of magnets in the flexible magnetic frame and a plurality of magnets in the rigid magnetic frame is greater than 20 lbs.

25. A mounting apparatus for an electronic communication device comprising:
   a holster to secure a device;
   a rigid magnetic frame having a front surface and a back surface, wherein the rigid magnetic frame is adjustably coupled to the holster at the front surface and further has an integrated clip system at the back surface, the integrated clip system being configured to engage with a front surface of a wearable garment, comprising; and
      a flexible magnetic frame configured to be positioned behind a back surface of an article of clothing while magnetically being engaged with the rigid magnetic frame, wherein the flexible magnetic frame comprises:
      two top tether cutouts placed along a middle top edge of the flexible magnetic frame to allow for tethering to a wearable garment,
      two bottom tether cutouts placed along a middle bottom edge of the flexible magnetic frame to allow for additional tethering to a wearable garment; and
      four middle tether cutouts that provide additional access for tethering, two of the four middle tether cutouts being placed along a middle left edge of the flexible magnetic frame and another two middle tether cutouts being placed along a middle right edge of the flexible magnetic frame.

26. A mounting apparatus for an electronic communication device comprising:
   a holster to secure a device;
   a rigid magnetic frame having a front surface and a back surface, the rigid magnetic frame being formed of a single molded rigid main body with a plurality of magnets integrated therein, the rigid magnetic frame being adjustably coupled to the holster at the front surface and further having an integrated clip system at the back surface, the integrated clip system being configured to engage with a front surface of a wearable garment; and
   a flexible magnetic frame configured to be positioned behind a back surface of an article of clothing while magnetically engaging with the plurality of magnets integrated within the rigid magnetic frame via a plurality of corresponding magnets integrated within the flexible magnetic frame.

27. The mounting apparatus of claim 26, wherein the flexible material conforms to variations in thickness of the wearable garment.

\* \* \* \* \*